Aug. 19, 1924. Re. 15,894
A. KÉGRESSE
SUPPORTING AND DRIVING BAND FOR MOTOR CARS
Original Filed March 30, 1921 2 Sheets-Sheet 1
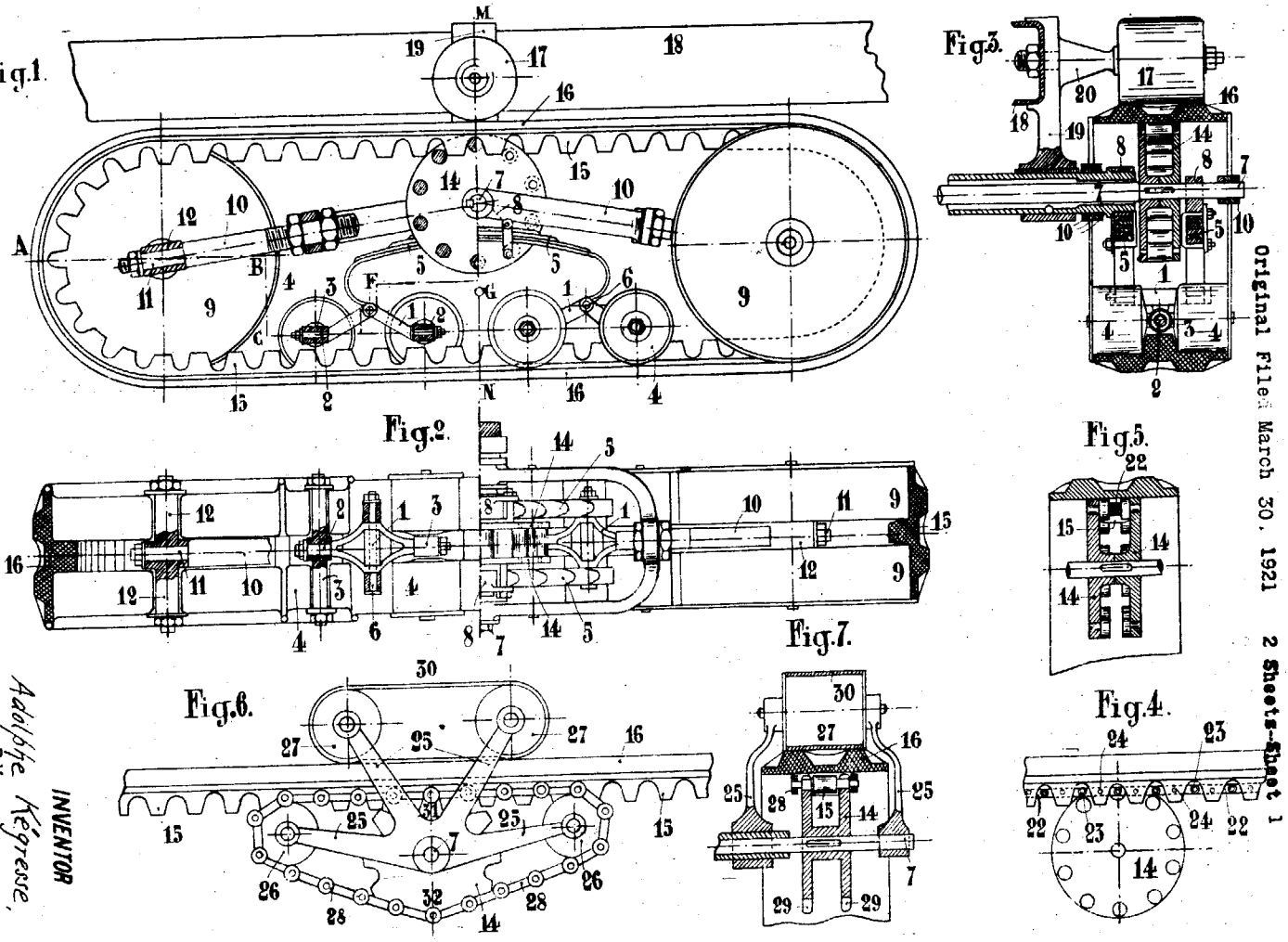
INVENTOR
Adolphe Kégresse,
BY
Emil Bonnelycke,
ATTORNEY Aug. 19, 1924. A. KÉGRESSE Re. 15,894
SUPPORTING AND DRIVING BAND FOR MOTOR CARS
Original Filed March 30. 1921 2 Sheets-Sheet 2
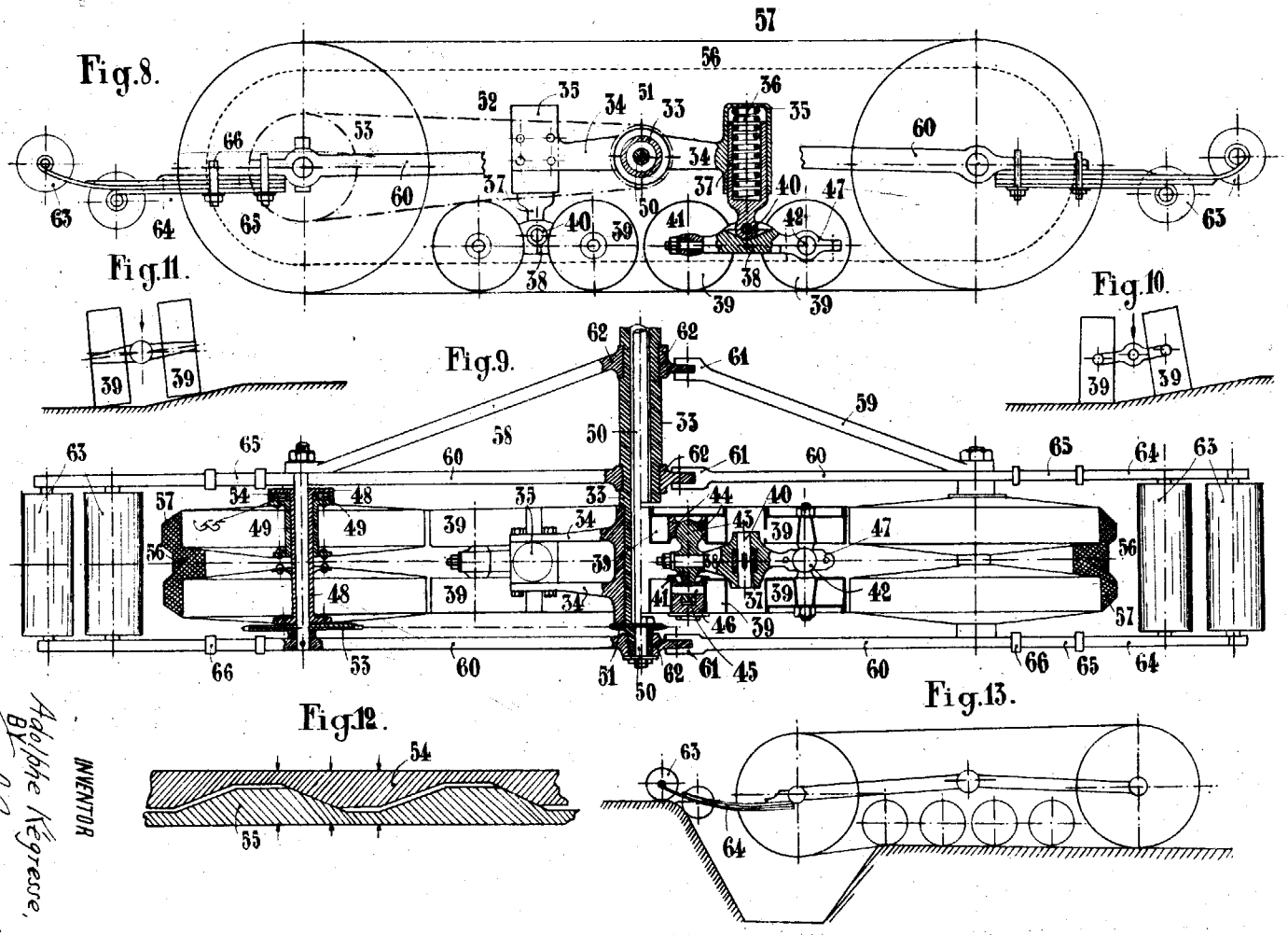
INVENTOR
Adolphe Kégresse,
BY
Emil Bornelycke,
ATTORNEY Reissued Aug. 19, 1924. Re. 15,894

UNITED STATES PATENT OFFICE.

ADOLPHE KÉGRESSE, OF PARIS, FRANCE.

SUPPORTING AND DRIVING BAND FOR MOTOR CARS.

Original No. 1,480,078, dated January 8, 1924, Serial No. 457,109, filed March 30, 1921. Application for reissue filed May 26, 1924. Serial No. 716,069.

(GRANTED UNDER THE PROVISIONS OF THE ACT OF MARCH 3, 1921, 41 STAT. L., 1313.

*To all whom it may concern:*

Be it known that I, ADOLPHE KÉGRESSE, citizen of the Republic of France, and resident of Paris, France (post-office address 28 Avenue de Tourville), have invented certain new and useful Improvements in Supporting and Driving Bands for Motor Cars (for which I have filed applications in France on April 3, 1917, Patent No. 494,526, and in England on April 18, 1917, Patent No. 127,322), which improvements are fully set forth in the following specification.

This invention relates to flexible, endless supporting and driving bands, and in particular to bands of the character indicated which are designed primarily for use on motor cars.

The invention aims, briefly, to simplify the supporting devices heretofore utilized in this connection, and to provide certain improvements hereinafter fully described, in or relating to the suspension devices, the supporting rollers and the band-driving means or mechanism; and it also resides in the provision of an improved means or device to enable the car to pass across ditches. A band of this general type is disclosed, for example, in my prior U. S. Patent No. 1,096,815, granted May 12, 1914, but the present invention is an improvement thereon in the respects noted.

The accompanying drawings illustrate by way of example some constructional forms of the improvements forming the subject matter of the present invention. In these drawings:

Figure 1 is a side view partly in vertical section of an apparatus for propelling motor cars by means of an endless band.

Figure 2 is a view partly in horizontal section on the line A—B—C—F—G of Fig. 1 and partly in plan; the upper stretch of the band being omitted.

Figure 3 is a cross section on the line M—N of Figure 1.

Figure 4 is a detail view in side elevation, showing the driving wheel or roller and a portion of the toothed endless band for cooperation therewith, the band being additionally equipped with a chain for distributing the strains imparted to the band by the driving roller.

Figure 5 is a transverse vertical section of Figure 4.

Figure 6 is a detail side elevation of a modified form of driving device or mechanism.

Figure 7 is a central transverse vertical section of Figure 6.

Figure 8 is a general view partly in elevation and partly in section of a further modification of the apparatus for driving the band by means of a driving wheel or pulley.

Figure 9 is a part-sectional plan view of Figure 8.

Figures 10 and 11 illustrate diagrammatically the position of the supporting rollers on uneven ground in the two modifications of supporting rollers shown in Figures 8 and 9.

Figure 12 is a development of the parts for producing the automatic adherence of a driving wheel or pulley on the endless band.

Figure 13 is a diagrammatic view illustrating the operation of the apparatus in crossing ditches.

In carrying the present invention into effect, the pairs of rollers 4 are connected together by rocking beams 1 (Figures 1, 2 and 3), the cylindrical ends 2 of which are fitted with slight friction in the central portion of the axle 3 of the rollers; each roller 4 consisting of two independently rotatable members mounted loosely upon axle 3, as shown. The rocking beams 1 are fixed at their centres to springs 5 by means of a freely movable pin 6. These springs are in their turn fixed to the axle 7 of the car by means of jointed collars 8. They are therefore able to assume various angles relatively to the car axle.

The load supported by the springs 5 is transmitted directly and wholly to the rocking beams 1 which in their turn are engaged at their ends 2 with the axles 3 of the rollers 4. The joint 2 allows the rollers 4 to follow the unevennesses of the ground transversely to the direction of travel. The pin 6 of the rocking beam 1 enables the same action to take place in the longitudinal direction by allowing the rollers to move vertically relatively to one another according to the contour and the unevennesses of the road.

By this means there is obtained a supporting apparatus which is absolutely flexible and adapted to follow transversely and longitudinally the contour of the ground over which the car is travelling.

Six, eight, ten or more rollers may be combined together with this apparatus.

The large wheels 9 (Figures 1 and 2) serve here only as supports and guides for the band. Their relatively large diameter facilitates passing over difficult ground. These wheels are maintained at the proper distance apart by means of stays 10 pivoted at their upper or inner ends to the car axle 7, and being formed at their outer ends with spindles 11 fitting with slight friction in the axles 12 of the wheels 9. By this means the large wheels are likewise enabled to follow the transverse unevennesses of the road whilst being capable of moving vertically with relation to one another by rocking about the car axle 7.

The driving of the endless band is effected in this case directly through the medium of an ordinary toothed wheel or roller 14 (Figure 1) fixed on the rotating part of the axle 7; its teeth engage with the teeth 15 of the band.

17 is a roller bearing upon the outer rolling track of the band 16; it maintains the latter at the proper distance from the toothed wheel 14. As the roller 17 is fixed to the chassis 18 by means of the bracket 20 and the part 19 for rendering the axle rigid, it will be understood that the action of the springs 5 will have no influence upon the proper working of this apparatus, especially in view of the flexibility and elasticity of the band.

With the teeth of the band there may be combined a metal chain 22 (Figures 4 and 5) jointed at the points 23. This chain passes inside the teeth and is fixed to the latter by rivets 24. All the teeth of the band are connected together by a rubber band in such a manner that the strain transmitted to one tooth by the driving pinion 14 will be distributed by the chain over all the other teeth of the endless band. The rollers or the teeth of the pinion 14 are adapted to allow of the passage of the chain 22.

Figures 6 and 7 illustrate another modification of the driving apparatus. The car axle 7 carries, jointed around it on each side of the band, arms 25 on the ends of which the rollers 26 and 27 are mounted loose. Two of the rollers 26 serve to support and guide a roller chain 28 of special construction which is wide enough to allow of the passage of the teeth 15 of the band and of the teeth 29 of the driving pinion 14. The latter transmits the power directly to the rollers of the chain at two points 31, 32, diametrically opposite each other. The chain drives in its turn the band by means of the teeth 15, and the effective length of this chain will depend on the power that is to be transmitted. The rollers 27 which may be connected together by an endless band 30 serve to assure a permanent contact between the band 16 and the chain 28.

I am aware that it has been proposed in connection with vehicle driving means to drive toothed endless belts or chains, which constitute endless tracks and pass around driving wheels and the like, by means of toothed wheels, and to employ load supporting rollers on the back of the lower stretch of the endless band, which are mounted on rocking beams.

In the constructional form shown in Figures 8 and 9, the whole of the mechanism is mounted free on the tube 33 of the driving axle of an existing motor car. On each end of this tube 33 there is mounted loose a double rocking beam 34, to the ends of which are fixed the internally cylindrical spring boxes 35. The springs 36 bear at their upper ends against the tops of the boxes 35 and at their lower ends against the bottoms of the hollow members 37 which rest on the rocking beams 38 which in their turn bear upon supporting rollers 39. The members 37 whose cylindrical upper portions fit with slight friction in the boxes 35, enable the springs 36 to assure the suspension of the car. Further, the members 37 which are guided for a considerable portion of their length in the interior of the boxes 35, assure the guiding of the supporting trains formed by the rocking beams 38 and rollers 39 whilst allowing of a certain amount of lateral flexibility owing to the cylindrical fitting which also allows of an angular displacement of the members 37 with relation to the fixed boxes 35. Each rocking beam 38 is connected to the corresponding member 37 by the pin 40 around which it is capable of moving, the mounting of the pins 40 being the substantial equivalent of that of the pins 6 as described above with reference to Figures 1 and 2.

The two ends of the rocking beam 38 are connected to the supporting rollers 39 by the axles 41 and 42.

Figure 9 shows the axle 41 as pivotally mounted at its center on the inner end of beam 38, and as provided at one end with a spherical head or ball 43 which fits in a two-part bearing 44, the latter having rotatably mounted on it the adjacent roller member 39; it being understood that each roller comprises two such members which are rotatable independently of each other. The head or ball 43 and the socket or bearing 44 may, however, be replaced by a ball-bearing of any suitable type. The other end of axle 41 is provided with a trunnion or spindle 45 on which is mounted a cylindrical rocker 46 having the other roller member 39 rotatably fitted on it.

The two combinations above described allow the supporting rollers to assume at right angles to their axes, positions similar to those shown in the diagram of Figure 10.

Fig. 11 shows in a diagrammatic manner on the same kind of ground, the position of the supporting rollers 39 fixed with considerable friction on the axle 42 (Fig. 9). This axle 42 carries at its centre a ball-shaped member adapted to rotate inside a divided bearing 47 formed in one piece with the rocking beam 38. The ball-shaped member may be replaced by a ball bearing of known type. The combination thus obtained with the axle 42 has the advantage of simplicity and is practically sufficient in many cases.

In the construction shown in Figs. 8 and 9, the endless band is driven by means of a wheel consisting of two parts, of which one is mounted on a central hub 48 and the other part is mounted on a secondary hub 49. This latter is loose on the central hub and is capable of sliding longitudinally thereon.

The central hub 48 and the corresponding part of the wheel are driven directly by a chain wheel 53 which receives its motion from the shaft 50 of the driving axle through the medium of the pinion 51 and the chain 52.

The half pulley fixed to the secondary hub 49 is driven by means of inclined clutch surfaces 54 and 55, of which one is fixed to the main hub 48 and the other to the secondary hub 49 (Figs. 9 and 12).

The automatic adhesion is effected on the cone 56 of the endless band 57. As a matter of fact, the half wheel corresponding to the secondary hub 49 is driven only through the medium of the inclined clutch surfaces 54 and 55. As soon as there is any tendency to slip, this half wheel, not being fixed on the central hub 48, will follow the movement of the band which seeks to move slowly in relation to the band of the half wheel of the central hub 48. The two hubs 48 and 49, moving through a certain angle relatively to each other, cause the inclined surfaces 54 and 55 to slip over each other, with the result that the two half wheels are brought nearer to each other, thereby increasing automatically the adhesion of the cone 56 of the band 57.

The side strains that are transmitted to the entire apparatus are taken up in this arrangement by two struts 58 and 59 (Figure 9) which are attached at one end to the inner stays 60 near the band wheels, and at their other ends are jointed to the axle tube 33. For constructional reasons the stays 59 and 60 of one of the wheels may be jointed on pins 61 formed on the heads 62 of the opposed stays as near as possible to the car axle, and all in one and the same line parallel to the said axle. The addition of the supplementary stays 59 does not interfere in any way with the oscillations of the large wheels since they are jointed to the same axles as the stays 60 of those wheels.

The car is enabled to pass over ditches by means of two or more rollers 63 (Figures 8 and 9) which are loose on their axles, the ends of which are attached to springs 64 fixed on the projecting parts 65 (Figure 8) of the struts 60 by means of collar straps 66.

This device has the effect of preventing the large supporting wheels of the endless band from descending into the ditch and of allowing them to engage the other side of the ditch at a favorable angle. The diagrammatic Figure 13 shows clearly the action of the said device.

What I claim is:—

1. In an automobile, an endless, flexible supporting and driving band; supporting wheels around which the band passes; and a system of rollers supporting the weight of the axle and bearing upon the band; said supporting wheels being devoid of rigid connection with the roller system and being adapted to rest freely upon the band and to rock vertically about an axis without acting on the chassis or on said roller system.

2. In an automobile, an axle; an endless, flexible supporting and driving band; a plurality of pairs of supporting rollers bearing thereupon; a rocking beam connected to each pair of rollers; a member for supporting said beams pivoted centrally to said axle; said member having its opposite ends resiliently connected to said beams; and supporting wheels, independent of said rollers, around which said band passes.

3. In an automobile, an endless, flexible supporting and driving band; a plurality of pairs of supporting rollers bearing thereupon, each roller comprising two independently rotatable members mounted on a common axle, a rocking beam for each pair of rollers connected at its ends to the central portions of the axles of said rollers to enable the same to oscillate transversely; means for supporting said beams; and supporting wheels, independent of said rollers, around which said band passes.

4. In an automobile, an endless, flexible supporting and driving band; a plurality of rollers bearing thereon; a pair of wheels around which the band passes, one of said wheels constituting a driver and comprising two members spaced apart from each other; a longitudinal projection on the inner surface of said band adapted to travel through the space between said members; and a chain for positively driving one member; both wheel members having hubs formed with inclined clutch surfaces for coaction with each other to force the two wheel members toward each other and thereby cause them to grip said projection between them.

5. In an automobile, an endless, flexible supporting and driving band; a plurality of rollers bearing thereon; a pair of wheels around which the band passes, one of said wheels constituting a driver and comprising two members spaced apart from each other; a longitudinal projection on the inner surface of said band adapted to travel through the space between said members; a chain for positively driving one member; and means on the hubs of the two wheel members to force said members toward each other and thereby cause them to grip said projection between them.

6. In a tractor, the combination of an endless, flexible track belt; front and rear drums around which the belt passes; a centrally-located axle; and a bearing train for said belt comprising a longitudinally-arranged beam disposed substantially parallel with the stretches of the belt and having a central pivotal connection with said axle, a spring-controlled, reciprocatory element connected with each end of the beam, and rollers supported by said reciprocatory elements and arranged to bear upon the inner surface of the lower stretch of the belt.

7. In a tractor, the combination of an endless, flexible track belt; front and rear drums around which the belt passes; and a bearing train or said belt comprising a pivotally-mounted balance beam, cylinders at opposite ends thereof, a plunger mounted in each cylinder, a roller support carried by each plunger, and rollers carried by said supports and arranged to bear upon the inner surface of the lower stretch of the belt, certain rollers having rock-joint connections with their supports.

8. A driving wheel for endless, flexible bands, comprising a plurality of sections adapted to grip the band between them; a driving axle whereon the wheel sections are mounted, one section being slidable bodily along the axle toward the section with which it coacts, to increase the gripping pressure; and interacting means carried by the wheel sections for effecting such sliding movement automatically when slippage of the band occurs.

9. A driving wheel for endless, flexible bands, comprising a plurality of sections adapted to grip the band between them; a driving axle whereon the wheel sections are mounted, one section being slidable bodily along the axle toward the section with which it coacts, to increase the gripping pressure; and interacting devices on the hubs of the wheel sections for effecting such sliding movement automatically when slippage of the band occurs.

10. A driving wheel for endless, flexible bands, including two sections adapted to grip the band between them; a driving axle whereon the wheel sections are mounted, one section being movable bodily laterally along the axle toward the other section to increase the gripping action; and inter-engaging inclined means associated with the wheel sections for effecting such lateral movement automatically when slippage of the band occurs.

11. In an automobile, an endless, flexible supporting and driving band; a pair of wheels around which the band passes, one of said wheels constituting a driver and comprising two members spaced from each other and adapted to grip the band between them; means for positively driving one of said wheel members; and means on the hubs of both members to automatically force them toward each other and thereby increase the gripping action.

12. In combination, an endless, flexible band having a longitudinal projection on its inner surface; a driving wheel around which the band passes comprising two sections engaging the said inner surface of the band at opposite sides of said projection, one section being movable laterally toward the other to cause them to grip the projection between them; and mechanical means positively connecting said sections for effecting such lateral movement automatically when slippage of the band occurs.

13. A driving wheel for endless, flexible bands, comprising a pair of sections adapted to grip the band between them, one section being positively driven; and mechanical means positively connecting said sections to automatically force them toward each other when slippage of the band on the driven section occurs.

14. A driving wheel for endless, flexible bands, comprising a pair of sections adapted to grip the band between them, one section being positively driven; and a connection between said sections embodying inclined devices on the hubs of the sections for automatically forcing them toward each other when slippage of the band on the driven section occurs.

15. In combination, an endless, flexible band having a longitudinal projection on its inner surface; a driving wheel around which the band passes comprising a pair of sections engaging the said inner surface of the band at opposite sides of said projection; a driving element whereon said sections are mounted, one section being positively driven thereby; and a positive mechanical connection between said sections to automatically force them toward each other when slippage of the band on the driven section occurs.

16. In combination, an endless, flexible band having a longitudinal projection on its inner surface; a driving wheel around which the band passes comprising a pair of sections engaging the said inner surface of the band at opposite sides of said projection; a driving element whereon said sections are mounted, one section being positively driven thereby; and a connection between said sections embodying inclined devices on the hubs of the sections to automatically force them toward each other when slippage of the band on the driven section occurs.

In testimony whereof I affix my signature.

ADOLPHE KÉGRESSE.